(12) United States Patent
Chiba et al.

(10) Patent No.: US 6,184,917 B1
(45) Date of Patent: Feb. 6, 2001

(54) LASER MARKING METHOD AND APPARATUS AND LIQUID CRYSTAL ELEMENT DRIVING METHOD

(75) Inventors: Teiichiro Chiba; Tsuyoshi Okubo; Yukihiko Sugimoto, all of Hiratsuka (JP)

(73) Assignee: Komatsu Ltd., Tokyo (JP)

( * ) Notice: Under 35 U.S.C. 154(b), the term of this patent shall be extended for 0 days.

(21) Appl. No.: 09/308,911

(22) Filed: Jul. 22, 1999

(30) Foreign Application Priority Data

Nov. 29, 1996 (JP) ................................. 8-319833

(51) Int. Cl.$^7$ ........................................ B41J 27/00
(52) U.S. Cl. ..................... 347/256; 347/241; 347/134
(58) Field of Search .......................... 347/241, 256, 347/136, 255, 247, 134; 219/121.73, 121.85, 121.6, 121.68, 121.69, 121.23

(56) References Cited

U.S. PATENT DOCUMENTS 5,734,145 * 3/1998 Ichihara et al. .............. 219/121.69
5,942,136 * 8/1999 Mori et al. ..................... 219/121.69

FOREIGN PATENT DOCUMENTS

| 2-293820 | 12/1990 | (JP) . |
| 3-116016 | 5/1991 | (JP) . |
| 5-42761 | 2/1993 | (JP) . |
| 6-226476 | 8/1994 | (JP) . |
| 6-304775 | 11/1994 | (JP) . |

OTHER PUBLICATIONS

International Search Report in PCT/JP97/04337, Feb. 24, 1998.

* cited by examiner

Primary Examiner—N. Le
Assistant Examiner—Lamson D. Nguyen
(74) Attorney, Agent, or Firm—Varndell & Varndell, PLLC

(57) ABSTRACT

In a laser marking method, wherein a liquid crystal mask having thereon a desired pattern to be marked is scanned with a laser beam to mark an object with the pattern by the laser beam passed through the liquid crystal mask, the liquid crystal mask is maintained in a predetermined condition of a temperature higher than the room temperature, a marking operation being carried out by using a laser beam in such a high-temperature condition, thus enabling a speed of response of the liquid crystal element, and a working efficiency concerning the laser marking operation to be improved.

10 Claims, 9 Drawing Sheets

LASER MARKING METHOD AND APPARATUS AND LIQUID CRYSTAL ELEMENT DRIVING METHOD

TECHNICAL FIELD

The present invention relates to a laser marking method and apparatus which scans a liquid crystal mask having thereon a desired pattern to be marked by a laser beam to mark an object such as IC with the pattern by the laser beam passed through the liquid crystal mask, and particularly to improvement for improving a speed of response of the liquid crystal mask.

BACKGROUND ART

A laser marker is attracting attention as a technology for stamping marks such as a product serial number and an identification sign on a produced semiconductor device in a semiconductor device production process.

Such a laser maker scans a liquid crystal mask having thereon a desired pattern to be marked by a laser beam to mark the pattern on an object such as IC by the laser beam passed through the liquid crystal mask.

Conventionally, when the liquid crystal mask is driven, the ambient temperature at which the liquid crystal is operated is set to about the room temperature in consideration of the temperature characteristic of liquid crystal itself of a liquid crystal mask circuit board and the temperature characteristic of peripheral circuits on the circuit board.

Thus, the conventional technology drives the liquid crystal mask in an operation temperature range of about the room temperature, so that the liquid crystal element has a slow speed of response. Therefore, it takes time to change the patterns to be marked, and a working efficiency of laser marking is not improved satisfactorily. In other words, when the liquid crystal element is driven in the operation temperature range of about the room temperature, a viscosity of the liquid crystal element is increased as compared with its driving at a high temperature, resulting in lowering the speed of response.

Recently, there have been proposed the liquid crystal element and peripheral circuits having good heat-resisting properties, and the environment, where the operation temperature range of the liquid crystal mask can be increased to the room temperature or above without any problem, is being prepared.

FIG. 8 shows a relation between liquid crystal drive voltage V and transmissivity of liquid crystal at five different temperatures. Conventionally, when the liquid crystal mask is driven, the liquid crystal drive voltage (ON voltage) V is set to voltage value Va of a range that the transmissivity of liquid crystal is largely changed in correspondence with a change in liquid crystal temperature. Therefore, the conventional technology adjusts to increase or decrease the drive voltage V depending on the temperature change in order to keep the transmissivity of liquid crystal as constant as possible.

But, the conventional technology cannot be used under a situation that the temperature change is extreme and its control to keep the transmissivity of liquid crystal at a fixed level is limited. And, the conventional technology needs an additional circuit for controlling to keep the transmissivity at a fixed level. Thus, it is disadvantageous in view of a cost and a space.

The present invention was achieved in view of the circumstances described above. And it is an object of the invention to provide a method and apparatus for laser marking which have improved efficiency of laser marking work by improving a response speed of liquid crystal and can perform the laser marking operation without being influenced by a change in external environmental temperature.

It is also an object of the invention to provide a method for driving a liquid crystal element, which can keep a constant transmissivity even under a condition with an extreme change in temperature.

DISCLOSURE OF THE INVENTION

The present invention relates to a laser marking apparatus in which a liquid crystal mask having thereon a desired pattern to be marked is scanned with a laser beam to mark on an object with the pattern by the laser beam having passed through the liquid crystal mask, characterized in that the apparatus comprises: temperature control means for maintaining the liquid crystal mask in a predetermined high-temperature condition higher than a room temperature; and control means for controlling to perform the marking operation by the laser beam in the high-temperature condition.

According to the invention, the laser marking operation is performed with the liquid crystal mask maintained in the predetermined high-temperature condition higher than the room temperature, so that the response speed of the liquid crystal is improved. Thus, time for switching the marking patterns can be shortened, and the laser marking working efficiency can be improved. Since the liquid crystal mask is maintained in the high-temperature condition substantially higher than the room temperature, the laser marking work can be performed without being influenced by a change in external environmental temperature (room temperature). Thus, the transmissivity of liquid crystal is not largely affected adversely even when the liquid crystal drive voltage is set to a voltage which is influenced by a change in temperature.

The invention uses the laser beam, which is essential for the laser marker, as heat source for maintaining the liquid crystal in the high-temperature condition.

Accordingly, the invention does not require another heat source for increasing the liquid crystal temperature. Thus, energy can be used effectively, and a cost and a space can be saved. Since the laser beam having good heat concentration is used, it serves to increase only the temperature of the display area of the liquid crystal mask, and an influence of heat to the peripheral parts can be decreased.

The invention sets the drive voltage to be in a range that the ON transmissivity is hardly changed even if the liquid crystal temperature is changed and drives the liquid crystal element by applying the determined drive voltage.

Therefore, the invention minimizes the change in transmissivity of liquid crystal even when the temperature of the liquid crystal is changed or the peripheral environmental temperature is changed, and the stamp quality can be kept uniform even if the environmental temperature is changed extremely.

BEST MODE FOR CARRYING OUT THE INVENTION

Embodiments of the present invention will be described in detail with reference to the accompanying drawings.

Figure 2:
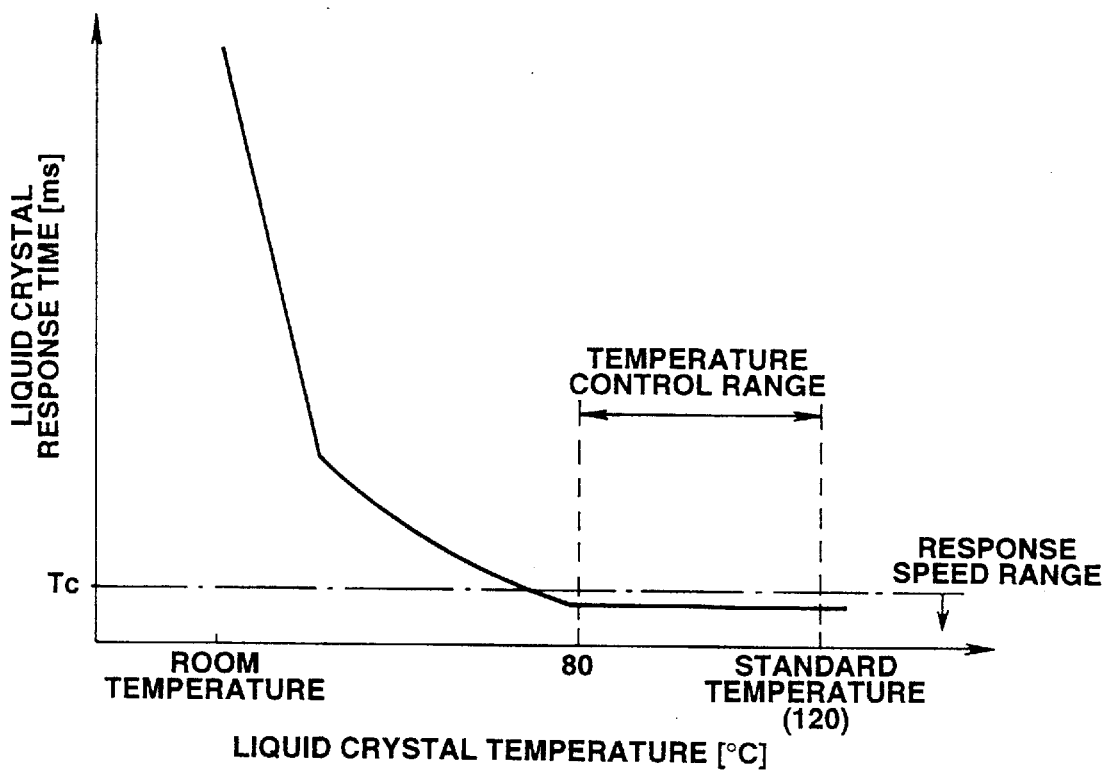
FIG. 2 is a graph showing a relation between a temperature of liquid crystal and response time of liquid crystal.

FIG. 2 shows a relation between a temperature of liquid crystal and a response time of a liquid crystal element. It is seen that the response time of the liquid crystal element is shortened gradually as the temperature increases to exceed around the room temperature and fixed at about a minimum value at a predetermined temperature (about 80° C.) or more. This temperature characteristic of the liquid crystal is taken into consideration, and the operating temperature range of the liquid crystal of this apparatus is set to a high temperature range of about 80° C. to about 120° C. so that response time smaller than value Tc can be obtained at all times.

Figure 3:
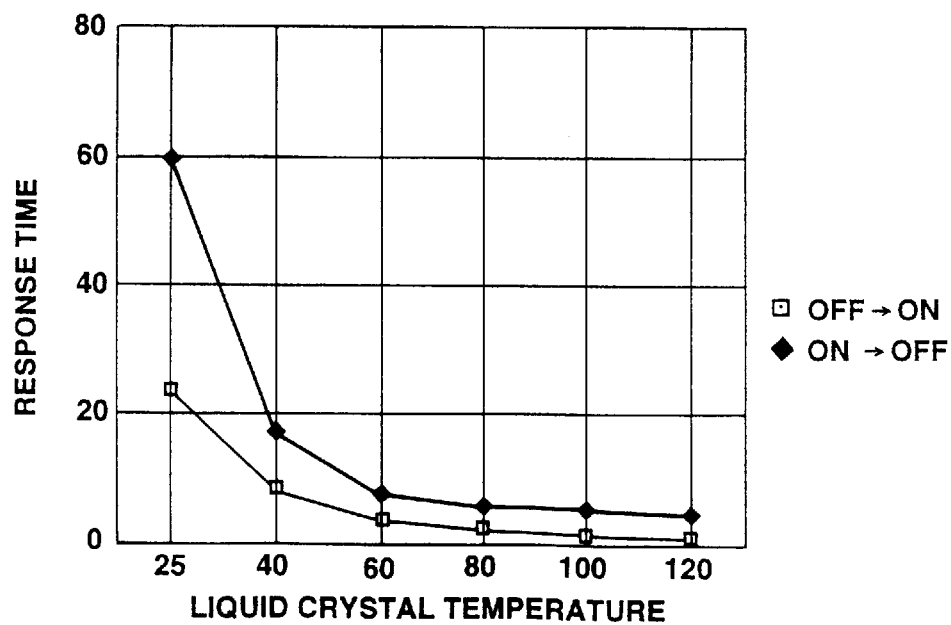
FIG. 3 is a graph showing experimental results between a temperature of liquid crystal and response time of liquid crystal.

FIG. 3 shows experimental results showing a relation between a temperature of a liquid crystal element and a response time upon switching from off to on and a relation between a temperature of a liquid crystal element and a response time upon switching from on to off.

Figure 4:
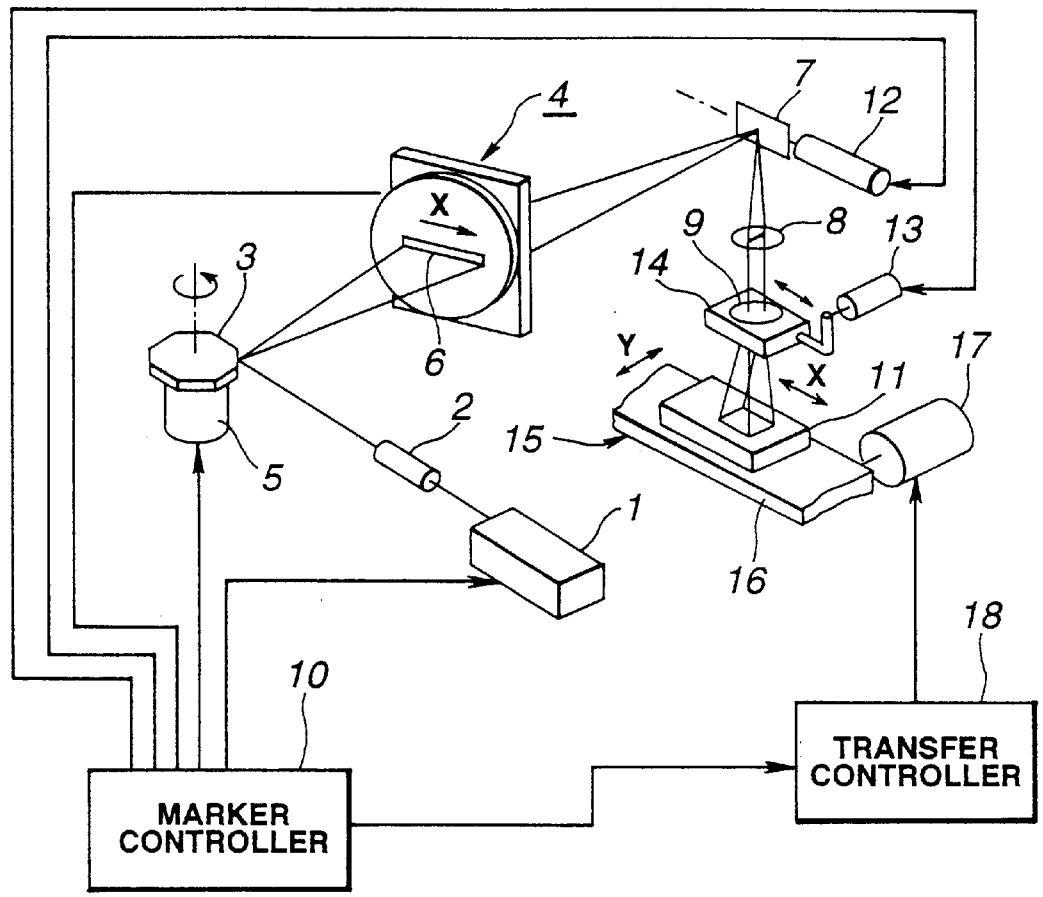
FIG. 4 is a diagram showing an overall structure of a laser-marking apparatus.

FIG. 4 is a schematic diagram showing the entire structure of a laser marking apparatus according to the invention.

In FIG. 4, a laser beam which is oscillated by laser oscillator 1 such as a YAG laser is shaped by optical lens 2 and entered liquid crystal mask 4 through polygon mirror 3 as X-direction polarizer. The polygon mirror 3 functions to scan pattern display area 6 of the liquid crystal mask 4 in direction X shown in the figure with the laser beam by rotating motor 5, and the laser beam is reflected on one surface of the polygon mirror 3 to perform main scanning for one line on the pattern display area.

The liquid crystal mask 4 is a high-molecular liquid crystal mask with durability to high heat, and various peripheral circuits (not shown) for driving the liquid crystal are disposed around the pattern display area. In this case, the pattern display area 6 has a laser beam-scattering state when no voltage is applied and a laser beam-penetrating state when a voltage is applied.

Figures 5A, 5B:
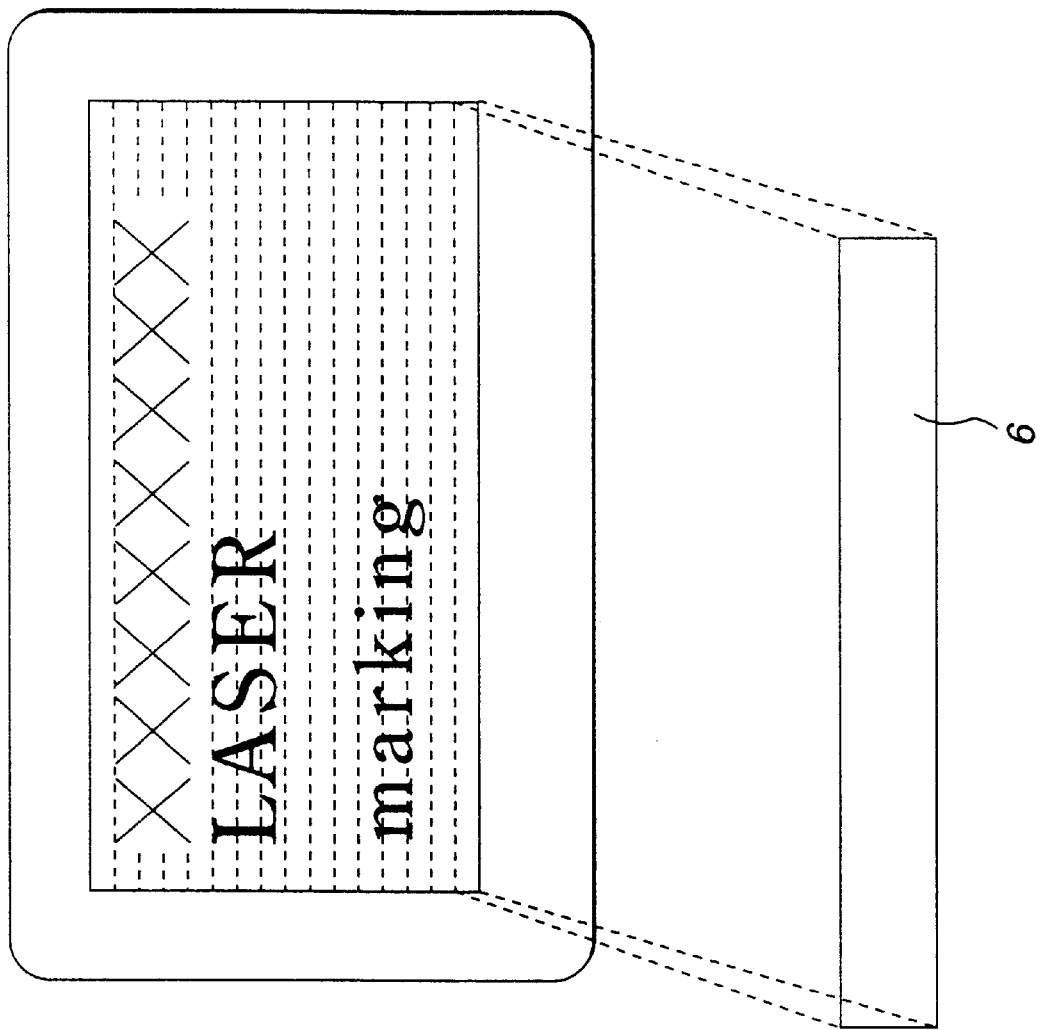
FIGS. 5(a) and 5(b) are diagrams showing a relation between a size of a pattern display area and a size of the entire marking pattern of a liquid crystal mask.

FIG. 5(b) shows the pattern display area 6 of the liquid crystal mask 4, and FIG. 5(a) shows a marking pattern stored in an unillustrated memory within marker controller 10. Specifically, for example a marking pattern of 128 dots long ×256 dots wide is stored in the memory within the marker controller 10. And the pattern display area 6 of the liquid crystal mask 4 has a linear display area of for example 8 dots ×256 dots. Therefore, the marking pattern stored in the memory within the marker controller 10 is vertically divided into 16 sections, which are sequentially switched in predetermined order so to be displayed on the pattern display area 6 of the liquid crystal mask 4, thereby marking the display pattern as shown in FIG. 5(a).

In this case, the pattern display area 6 of the liquid crystal mask 4 has only a width (in a vertical direction) corresponding to a single main scanning by the laser beam directed by the polygon mirror 3 and is not undergone sub-scanning by the laser beam. Therefore, the liquid crystal mask 4 of this embodiment keeps the pattern display area 6 always exposed to the laser beam while marking is being performed, so that it is advantageous in maintaining the pattern display area 6 at a high temperature as compared with a liquid crystal mask on which the pattern display area 6 has a width corresponding to a plurality of main scanning by the laser beam.

In FIG. 4, the laser beam which has passed through the liquid crystal mask 4 is irradiated onto target object 11 such as IC through mirror 7 as a Y-direction polarizer, lens 8 and lens 9 provided with a movable table as X-direction polarizer, and the marking pattern displayed on the pattern display area 6 of the liquid crystal mask 4 is marked on the object 11. The mirror 7 as the Y-direction polarizer is rotated by motor 12 to polarize the laser beam in direction Y, and the lens 9 as the X-direction polarizer polarizes the laser beam in direction X as the movable table 14 is moved by motor 13. The mirror 7 and the lens 8 are disposed to align the laser beam with the object 11.

The marker controller 10 controls the polygon mirror motor 5, the motor 12 and the motor 13 and the laser oscillation effected by the laser oscillator 1. Besides, the marker controller 10 controls switching of the marking pattern on the liquid crystal mask 4.

The object 11 such as IC is placed on stage 16 of conveying device 15 so to be moved by the rotation of drive motor 17. In this case, the conveying device 15 is controlled by transfer controller 18.

Figure 6:
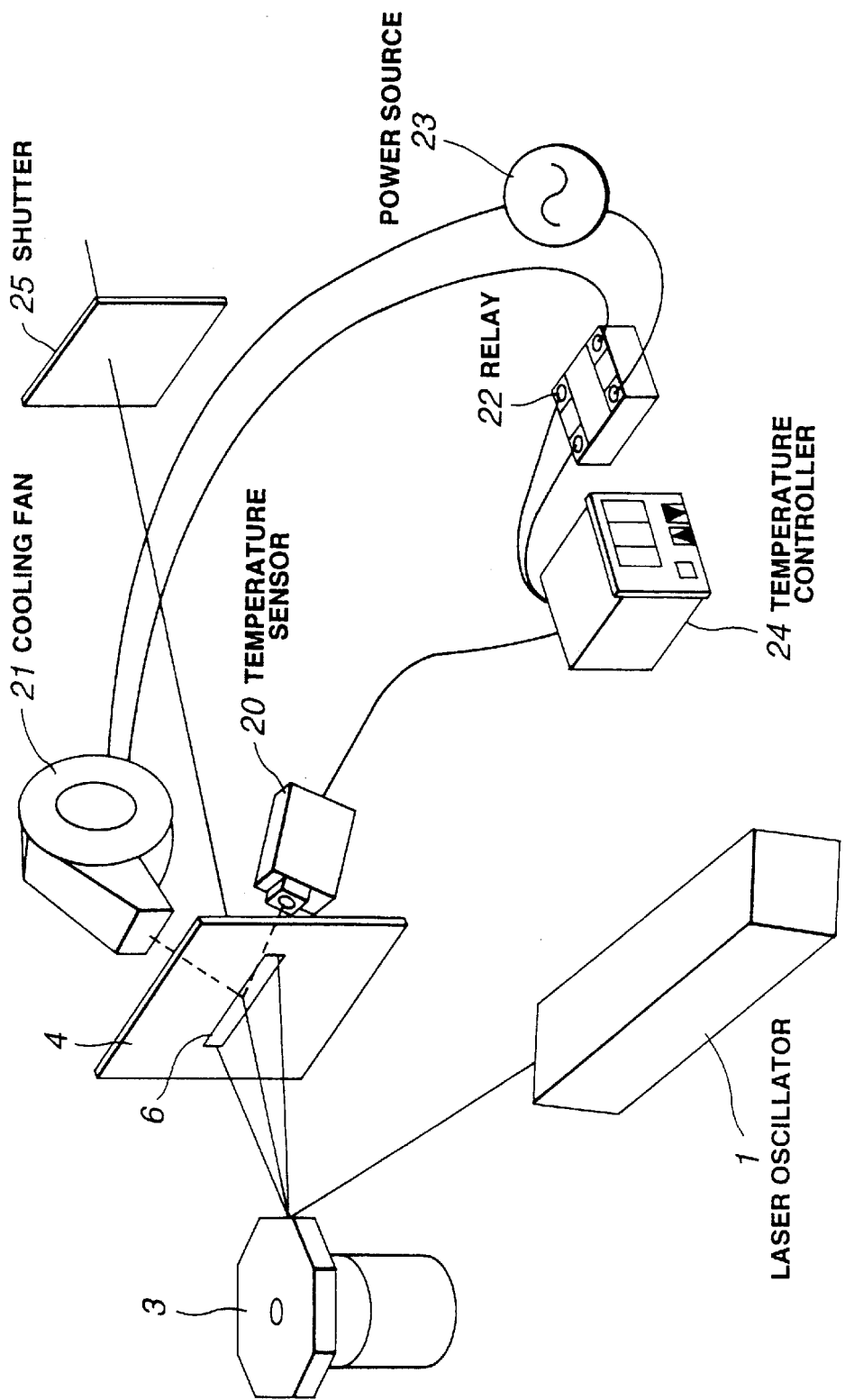
FIG. 6 is a diagram showing a structure of a temperature control system of a liquid crystal mask.
Figure 7:
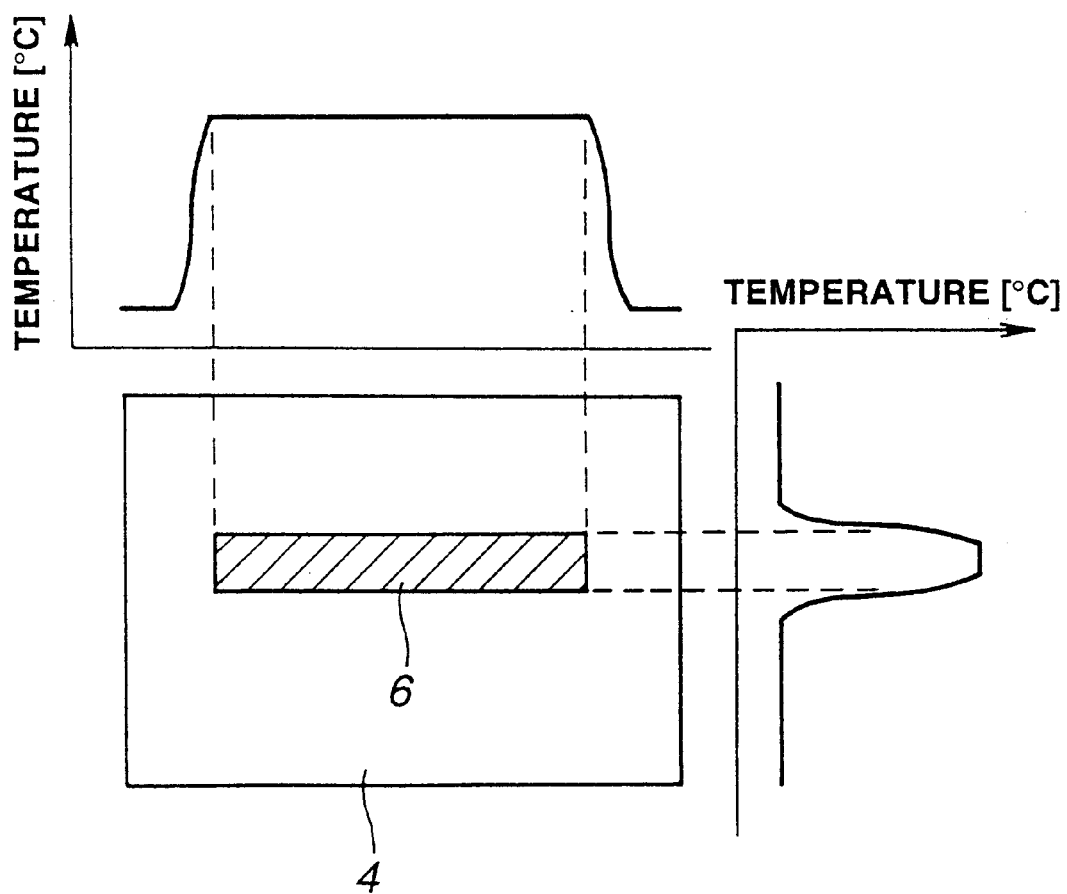
FIG. 7 is a diagram showing temperature distribution of a pattern display area of a liquid crystal mask.

FIG. 6 shows a structure of a temperature control system for the liquid crystal mask 4. In this embodiment, the laser oscillator 1, which is used for laser marking, is also used as a heat source for raising the pattern display area 6 of the liquid crystal mask 4 to a high temperature. Specifically, by scanning at a given speed by using the laser beam having good energy concentration as the heat source, only the pattern display area 6 is maintained in a high-temperature condition (less thermal influence on the peripheral parts) as shown in FIG. 7, and the entire pattern display area 6 can be controlled at a uniform temperature.

Temperature sensor 20 for measuring a temperature of the pattern display area 6 and cooling fan 21 for cooling the pattern display area 6 are disposed in the vicinity of the liquid crystal mask 4. A temperature value detected by the temperature sensor 20 is input to the temperature controller 24, which outputs the detected value to the marker controller 10 shown in FIG. 4. Reference numeral 22 is a relay and 23 is an AC power source. Shutter 25 disposed on the way of the laser beam as shown in FIG. 6 interrupts the laser beam to prevent it from being irradiated onto the object 11 when preheating in order to increase a temperature of the liquid crystal mask 4 by irradiating the laser beam onto the liquid crystal mask 4.

Figure 8:
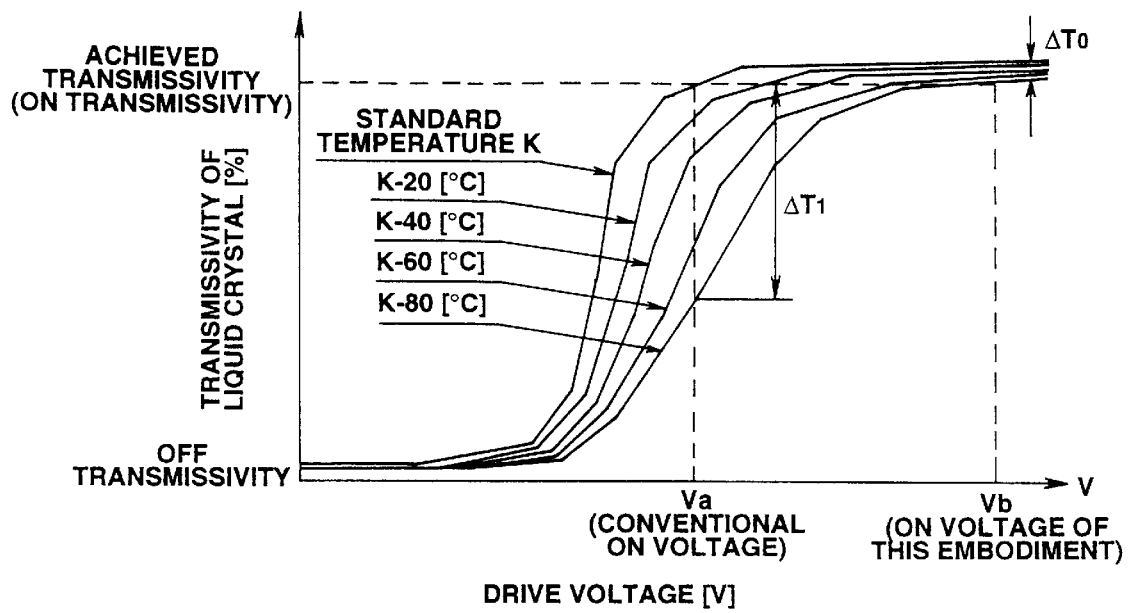
FIG. 8 is a diagram showing a relation between a liquid crystal drive voltage and a liquid crystal transmissivity with a liquid crystal temperature as a parameter.

FIG. 8 shows a relation between transmissivity of liquid crystal and drive voltage V of the liquid crystal element at five different temperatures (k, k−20, k−40, k−60, k−80° C.). In this embodiment, a liquid crystal drive voltage is set as high voltage Vb at a level substantially not to change ON transmissivity even if a temperature of the liquid crystal is changed, and the liquid crystal element is driven by applying the set drive voltage Vb. Specifically, it is assumed that ΔT1 denotes dispersion of transmissivity of liquid crystal with voltage Va, and ΔT0 denotes dispersion of transmissivity of liquid crystal with the voltage Vb. Then, ON voltage of the liquid crystal is set to fall in a range constituting ΔT0<ΔT1.

Figure 9:
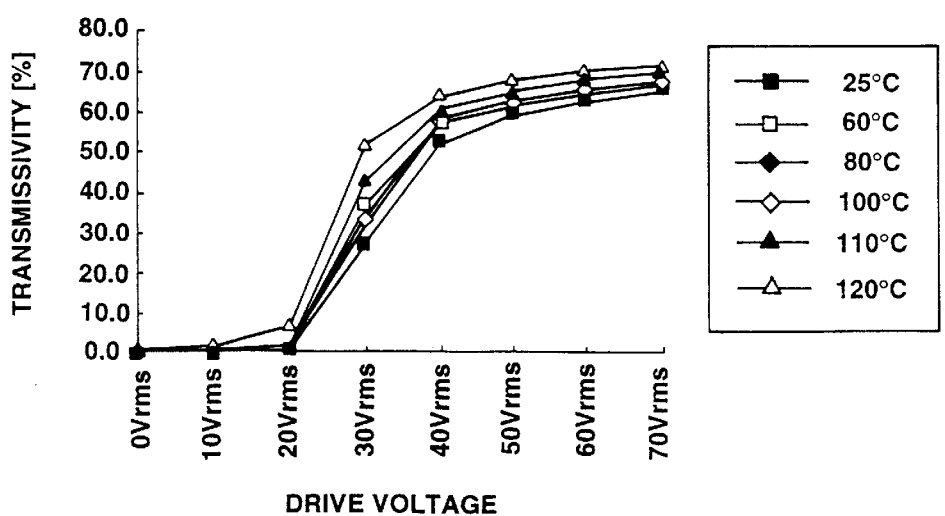
FIG. 9 is a diagram showing experimental results which show a relation between a drive voltage of liquid crystal and a liquid crystal transmissivity with a liquid crystal temperature as a parameter.

FIG. 9 shows experimental results indicating a relation between transmissivity of liquid crystal and drive voltage V of a liquid crystal element at six different liquid crystal temperatures (25° C., 60° C., 80° C., 100° C., 110° C., 120° C.). According to the experimental results, Vb is set to about 50V to about 70V.

Thus, this embodiment determines a liquid crystal drive voltage to high voltage Vb with which ON transmissivity is hardly changed even if the temperature of the liquid crystal changes. The change in transmissivity of the liquid crystal can be suppressed to a minimum against the change in temperature of the liquid crystal itself or a surrounding environmental temperature, and marking quality can be made uniform under the circumstances that a temperature changes extremely.

Figure 10:
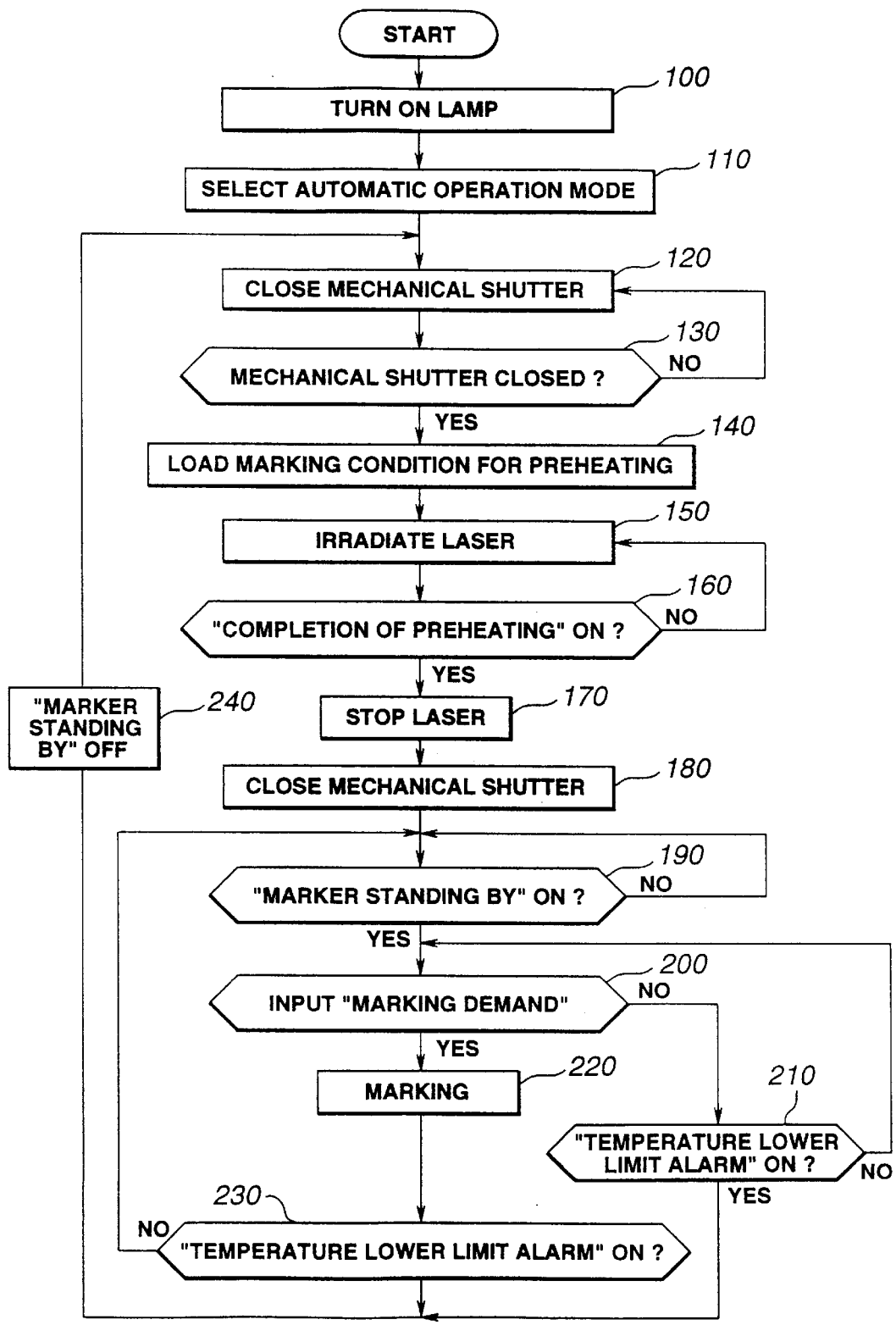
FIG. 10 is a flowchart showing the overall temperature control to perform laser marking.
Figure 11:
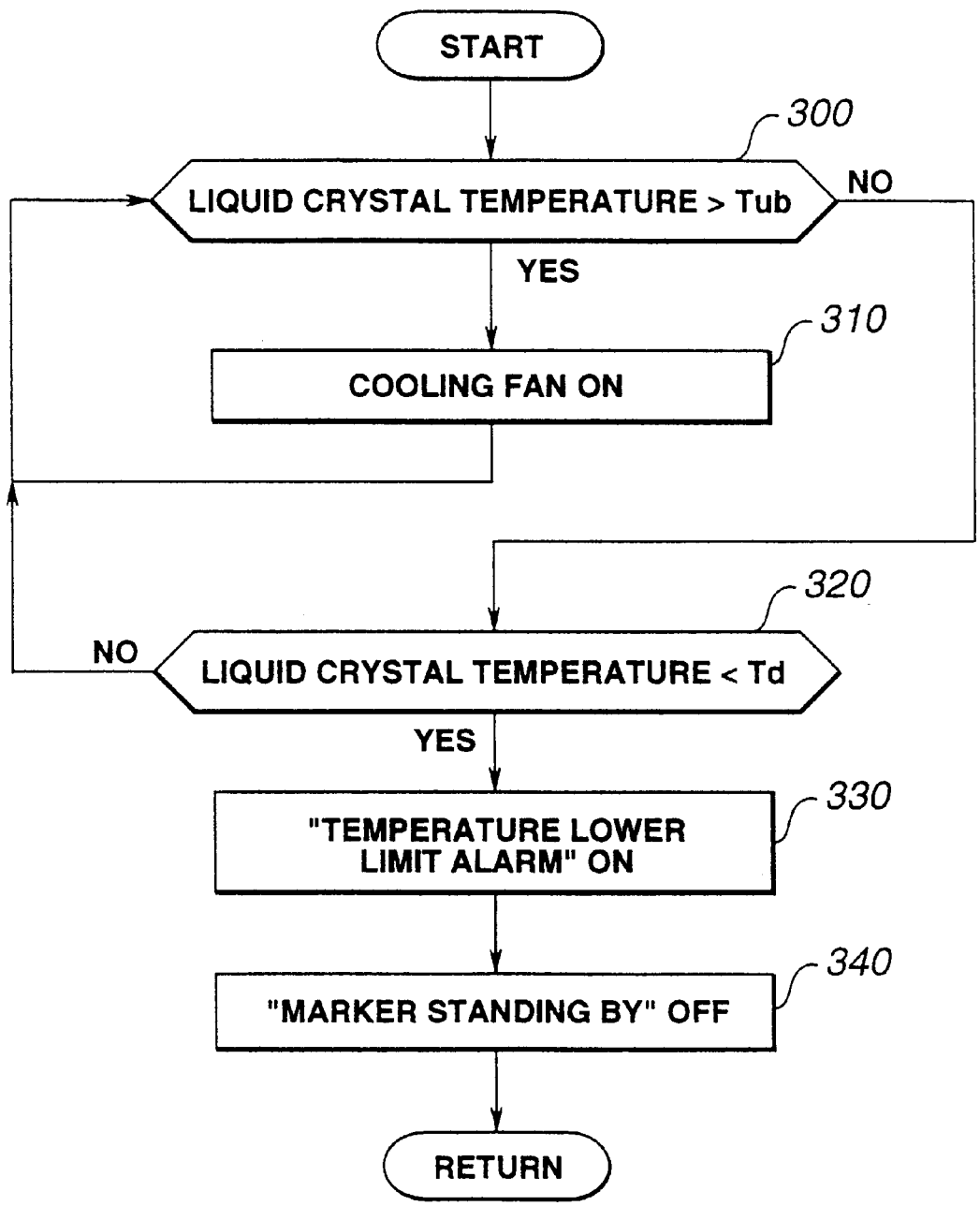
FIG. 11 is a flowchart showing the temperature control during the laser marking.

Temperature control of the liquid crystal at laser marking will be described with reference to the time chart of FIG. 1 and the flowcharts of FIG. 10 and FIG. 11. FIG. 10 shows generally the temperature control when marking by a laser beam. And FIG. 11 shows temperature control when marking on the object 11 by a laser beam.

First, an operator turns on a lamp and selects an automatic operation mode before starting the laser marking (steps 100, 110). The automatic operation mode is a mode to automatically operate the laser marker.

When the automatic operation mode is selected, the marker controller 10 closes the mechanical shutter 25 shown in FIG. 6 to prevent the laser beam oscillated by the laser oscillator 1 from reaching the object 11 placed on the conveying device 15 (steps 120, 130).

The marker controller 10 then loads marking condition data for preheating determined by the operator (step 140) and controls according to the loaded conditions the laser oscillator 1 and the polygon mirror motor 5 to direct the laser beam to the pattern display area 6 of the liquid crystal mask 4. Thus, the pattern display area 6 is preheated to predetermined high temperature Tua (110° C. as shown in FIG. 1) (step 150, a preheating period shown in FIG. 1). When preheating, the pattern display area 6 of the liquid crystal mask 4 is put into a non-light permeable state that the laser beam does not pass through it. Thus, the liquid crystal temperature is gradually increased by preheating.

Temperature controller 24 detects that the temperature of the liquid crystal has become 110° C. or more in view of the detected value of the temperature sensor 20 and outputs a preheating termination signal to the marker controller 10. Accordingly, the marker controller 10 stops the laser beam and opens the mechanical shutter 25 (steps 170, 180). The marker controller 10 then transmits a marker stand-by signal to the transfer controller 18 (step 190). The marker stand-by signal indicates that the laser marker is ready to make marking any time and can accept a marking demand from the transfer controller 18.

Figure 1:
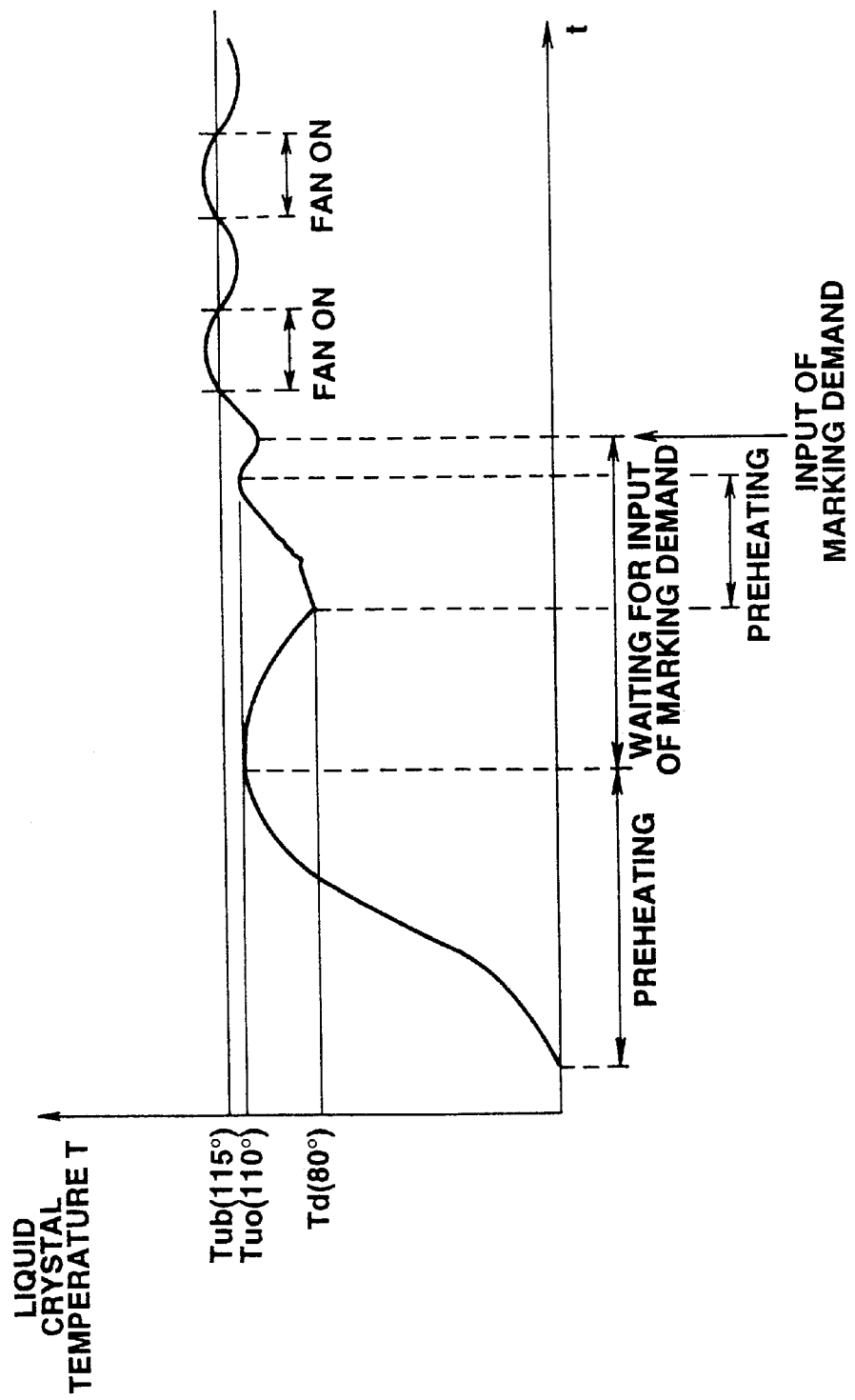
FIG. 1 is a time chart showing the temperature control to perform laser marking.

When waiting for input of the marking demand signal from the transfer controller 18, the temperature controller 24 is monitoring the liquid crystal temperature in view of the detected value of the temperature sensor 20 and switches on a temperature lower limit alarm signal when the liquid crystal temperature lowers to lower limit value Td (80° C. as shown in FIG. 1) or below because of delayed input of the marking demand signal from the transfer controller 18 or the like. When the temperature lower limit alarm signal becomes ON, the marker controller 10 switches OFF the marker stand-by signal (step 240) and shifts the procedure to step 120 to preheat once again.

Meanwhile, when the marking demand is input from the transfer controller 18, the marker controller 10 controls the oscillation of the laser oscillator 1, the display switching of the marking pattern on the liquid crystal mask 4 and the driving of the polygon mirror motor 5, the motor 12 and the motor 13 to perform laser marking (step 220). When a temperature lower limit alarm signal is input from the temperature controller 24 during the laser marking operation (step 230, this does not occur in a normal condition), the marker controller 10 switches OFF the marker stand-by signal (step 240), shifts the procedure to step 120, and performs the preheating operation once again.

When the liquid crystal temperature exceeds predetermined upper limit value Tub (115° C. as shown in FIG. 1) during the laser marking (step 300 in FIG. 2, the temperature controller 24 operates the cooling fan 21 until the liquid crystal temperature lowers to below the upper limit value Tub (step 310). As described above, when the liquid crystal temperature lowers to below the lower limit value Td during the laser marking operation, the temperature controller 24 switches ON the temperature lower limit alarm signal. As a result, the marker stand-by signal is turned off by the marker controller 10 (steps 320 to 340).

In this embodiment, the laser oscillator for laser marking was used as the heat source for raising the liquid crystal mask to a high temperature, but another heat source may be used.

And the pattern display area of the liquid crystal mask had a width corresponding to a single main scanning made by the laser beam, but it may have a width corresponding to several main scanning lines.

INDUSTRIAL APPLICABILITY

A laser marking apparatus scans a liquid crystal mask showing thereon a desired marking pattern by a laser beam to mark the marking pattern on an object such as IC by the laser beam having passed through the liquid crystal mask, in which a response speed of the liquid crystal mask is improved.

What is claimed is:

1. A laser marking method in which a liquid crystal mask formed of a heat-resistant high-molecular liquid crystal having thereon a desired pattern to be marked is scanned with a laser beam to mark an object with the pattern by the laser beam having passed through the liquid crystal mask, which comprises:

a first step of putting the liquid crystal mask in a non-light permeable state to prevent the laser beam from passing though the liquid crystal mask before the marking operation and preheating the liquid crystal mask by irradiating the laser beam onto the liquid crystal mask so as to raise a temperature of the liquid crystal mask to a first predetermined temperature higher than a room temperature; and a second step of performing a marking operation on the crystal object while adjusting a temperature of the liquid crystal mask to maintain the liquid crystal mask raised to the first predetermined temperature in a predetermined temperature range between the first predetermined temperature and a second predetermined temperature which is lower than the first predetermined temperature and higher than the room temperature.

2. A laser marking method according to claim 1, wherein in the second step, the laser beam is irradiated onto the liquid crystal mask when the temperature of the liquid crystal mask lowers to the second predetermined temperature or below to maintain the liquid crystal mask in the temperature range between the first predetermined temperature and the second predetermined temperature.

3. A laser marking method according to claim 1, wherein in the second step, when the temperature of the liquid crystal mask increases to a third predetermined temperature higher than the first predetermined temperature during the marking operation to the object, the liquid crystal mask is cooled until the liquid crystal mask lowers to below the third predetermined temperature.

4. A laser marking apparatus in which a liquid crystal mask having thereon a desired pattern to be marked is scanned with a laser beam to mark on an object with the pattern by the laser beam having passed through the liquid crystal mask, characterized in that the apparatus comprises:

temperature control means for irradiating the laser beam onto the liquid crystal mask before the marking operation to maintain the liquid crystal mask in a predetermined high-temperature condition higher than a room temperature; and control means for controlling to perform the marking operation by the laser beam in the high-temperature condition;

wherein the temperature control means performs the preheating operation when the liquid crystal mask lowers to a temperature lower than a predetermined lower limit temperature in the high-temperature condition during a time period between marking operations.

5. A laser marking apparatus according to claim 4, wherein the temperature control means further comprises:

liquid crystal mask cooling means for cooling the liquid crystal mask; and cooling control means for driving the liquid crystal mask cooling means, when the liquid crystal mask exceeds a predetermined upper limit temperature in the high-temperature condition during the marking operation, until the liquid crystal mask lowers to a temperature less than the upper limit temperature.

6. A laser marking apparatus according to claim 5, wherein the liquid crystal mask cooling means is a cooling fan for blowing air to the liquid crystal mask.

7. A laser marking apparatus in which a liquid crystal mask made of a high-molecular liquid crystal having heat resistance having thereon a desired pattern to be marked is scanned with a laser beam to mark on an object with the pattern by the laser beam having passed through the liquid crystal mask, which comprises:

preheating control means for putting the liquid crystal mask in a non-light permeable state to prevent the laser beam from passing through the liquid crystal mask before the marking operation and preheating the liquid crystal mask by irradiating the laser beam onto the liquid crystal mask to raise a temperature of the liquid crystal mask to a first predetermined temperature higher than a room temperature; and temperature control means for adjusting the temperature of the liquid crystal mask so that the temperature of the liquid crystal mask falls in a predetermined temperature range between the first predetermined temperature and a second predetermined temperature lower than the first predetermined temperature and higher than the room temperature in a period between the termination of the preheating operation and the start of the marking operation and in a period between marking operations.

8. A laser marking apparatus according to claim 7, wherein the temperature adjusting means irradiates the laser beam onto the liquid crystal mask to maintain the liquid crystal mask in the temperature range between the first predetermined temperature and the second predetermined temperature when the temperature of the liquid crystal mask lowers to the second predetermined temperature or below.

9. A laser marking apparatus according to claim 7, further comprising:

liquid crystal mask cooling means for cooling the liquid crystal mask; and cooling control means for cooling the liquid crystal mask, when the temperature of the liquid crystal mask increases to a third predetermined temperature higher than the first predetermined temperature during the marking operation to the object, until the liquid crystal mask lowers to a temperature below the third predetermined temperature.

10. A laser marking apparatus according to claim 9, wherein the liquid crystal mask cooling means is a cooling fan for blowing air to the liquid crystal mask.

* * * * *